United States Patent Office 2,735,838
Patented Feb. 21, 1956

2,735,838

METHOD OF PRODUCING A RESINOUS CONDENSATION PRODUCT

Rinse Dijkstra and Jelis de Jonge, Eindhoven, Netherlands, assignors to Hartford National Bank and Trust Company, Hartford, Conn., as trustee No Drawing. Application June 19, 1953,
Serial No. 362,966

Claims priority, application Netherlands June 11, 1952

6 Claims. (Cl. 260—56)

Our invention relates to the production of resinous condensation products of the phenol furfural type.

More particularly, our invention relates to resinous condensation products produced by heating furfural and phenol, i. e., monohydroxybenzene and alkyl derivatives thereof, with an alkaline substance acting as a catalyst, such as ammonia, alkali and alkaline earth hydroxides, alkali carbonates, tertiary amines, for example triethyl amine and dimethyl aniline, and melamine and methylol derivative of melamine, the condensation reaction with the formation of water preferably proceeding so long as is compatible with the further working up of the resinous product.

It is known that in working up phenol-aldehyde condensation products involves difficulties if the quantity of aldehyde combined with phenol with the formation of water exceeds about 1 mol. aldehyde per mol. phenol. Consequently, it is desirable to obtain such condensation products wherein phenol has reacted with furfural with the formation of only little less than 1 mol. water per mol. phenol.

It has been described that the production of such phenol furfural condensation products entails difficulties chiefly because the condensation reaction proceeds extremely slowly at a low temperature, for example 110° C., and at a higher temperature, for example 140° C. to 160° C., the condensation product becomes intractable even before the condensation reaction has proceeded to the desired point.

Our invention resides in a method of obtaining, at an increased temperature, resinous, moderately viscous condensation products, in which furfural has reacted with a phenol, by warming a phenol together with furfural in the presence of an alkaline substance acting as a catalyst, in which at most 0.1 mol. catalyst per mol. phenol is added to the reaction mixture partly for starting up the condensation reaction and partly during this reaction, the condensation reaction being allowed to proceed until a little less than 1 mol. water per mol. phenol has been split off.

The method according to the present invention is generally not so very effective, in that the viscosity of the resulting condensation product is not significantly lowered, if an active catalyst such as an alkali metal hydroxide and an alkali metal carbonate is used.

Preferably, in carrying out the method according to the invention, a less active catalyst, for example alkaline earth hydroxide is used. As an alternative amines, for example primary amines, are eminently suitable for this purpose.

In U. S. application Ser. No. 257,941 filed November 23, 1951, a process has been described according to which ammonia or a primary amine is caused to coreact with a phenol, furfural and a catalyst also yielding highly condensated products of low viscosity. According to this method the optimum proportion of ammonia or primary amine corresponds to between 0.1 and 0.2 mol. for each mol. of the phenol in the reacting mixture. In a further preferred example of the present invention use is made of a quantity of ammonia of less than 0.1 mol. per mol. phenol and, after the condensation reaction has been started up by adding catalyst, still more catalyst is added during the condensation reaction.

We have found that the products obtained in the hardened state after conversion of the phenol furfural condensation products possess a greater mechanical strength and shrink less on hardening if, during the condensation reaction of phenol with furfural, the action of the catalyst is supported by adding less than 0.1 mol. ammonia per mol. phenol.

The invention may be carried out in such manner that catalyst is continuously added to the condensing mixture. Since, however, it is not necessary to use large quantities of catalyst, a quantity of a few grams per mol. phenol being sufficient, it may be preferable to add a small quantity of catalyst at regular time intervals to the reacting mixture.

By thus carrying out the method according to the invention a condensation product, in which per mol. phenol about 0.8 mol. furfural combines with the formation of water, can be obtained in three to four hours during which time the temperature is raised from 120° C. to 170° C. Therefore, the condensation preferably takes place at said temperatures.

*Example I*

2 mol. monohydroxybenzene were mixed with 12 g. water, 1.8 mol. furfural and 2.5 g. calcium hydroxide in a round-bottomed flask by means of a stirrer and a distillation cooler. The mixture was rapidly heated to 100° C. and further heated slowly so that the temperature rose to 160° C. in one hour, which temperature was maintained at 160° C. until the termination of the reaction. 30 minutes after the temperature in the flask had risen to 100° C. 1 g. calcium hydroxide was added and this was three times repeated at intervals of 15 minutes. After the last admixture the heating was continued for one hour and the reaction product subsequently poured out into a flat container. From the weight and the composition of the product of distillation it was determined that 0.77 mol. furfural had combined with the formation of water. If the same quantity of catalyst as used in total for the test had been added in a single quantity, the formation of water would proceed much more slowly so that after eight hours the quantity of water split off would have been approximately equal and the reaction mixture would have become so viscous as to be intractable.

*Example II*

2 mol. monohydroxybenzene, 12 g. water, 1.9 mol. furfural and 0.08 mol. ammonia in the form of a 25% solution in water were warmed with 2.5 g. calcium hydroxide in the manner as described in Example I. 30 minutes after reaching a temperature of 100° C. 1 g. calcium hydroxide was added, which was repeated four times at intervals of 15 minutes. 135 minutes after reaching the temperature of 100° C. it was determined from the composition and quantity of product of distillation that per mol. phenol 0.83 mol. furfural had been linked with the formation of water. The reaction was subsequently interrupted and the thinly liquid mass, which solidified to a brittle resin after cooling, was mixed with wood flour and hexamethylene tetramine to form molding powder from which a plate (I) was molded. Similarly, a plate II was molded, in which a condensation product of monohydroxybenzene and furfural had been incorporated, the conversion having been accomplished by an equal quantity of calcium hydroxide and 0.16 mol. ammonia per mol. phenol.

On molding the plate I shrunk 0.77% and the plate II 1.02%. The resistance to shock of plate I was 2.4 kg./cm.², that of plate II 2.0 kg./cm.², the said values being 7.5 and 7.0 kg./cm.² respectively as regards the shock bending strength.

*Example III*

Similarly to Example I, 2 mol. monohydroxybenzene, 12 g. water, 2⅛ mol. furfural and 0.08 mol. ethylene diamine were mixed and heated in 40 minutes to 160° C. at which temperature the mixture was maintained until the reaction was interrupted. One hour after reaching the temperature of 160° C., a further quantity of ethylene diamine of 0.04 mol. was added, of which ⅛ part was added each time at intervals of 10 minutes. 20 minutes after adding the last quantity, the contents of the flask were poured out into a shallow container, in which it solidified to form a brittle resin. From the quantity and the composition of the product of distillation it was determined that per mol. monohydroxybenzene in the resin 0.92 mol. furfural had combined with the formation of water.

If, however, the same quantities of monohydroxybenzene and furfural were reacted at the same temperatures with a quantity of ethylene diamine of 0.12 mol. added in a single quantity at the outset of heating, the quantity of water formed in the same lapse of time resulted in not more than 0.75 mol. furfural being condensed.

While we have thus described our invention with specific examples and applications thereof, other modifications therein will be apparent to those skilled in this art without departing from the spirit and scope of the invention as defined in the appended claims.

What is claimed is:

1. A method of producing a resinous condensation product of the phenol-aldehyde type which comprises mixing about one mole of phenol together with about one mole of furfural and less than 0.1 mole of an alkaline catalyst and in an amount sufficient to commence the reaction, heating the reaction mixture to a temperature of about 120 to 170° C., adding an additional quantity of the catalyst in an amount which together with the portion initially provided in the reaction mixture is less than 0.1 mol. of the catalyst per mol. of the phenol, and terminating the reaction when less than 1 mol. water per mol. of phenol is split off.

2. A method as claimed in claim 1, in which the catalyst is an alkaline earth hydroxide.

3. A method as claimed in claim 2, in which a quantity of ammonia smaller than 0.1 mol. phenol is added to the phenol furfural mixture.

4. A method as claimed in claim 3, in which the condensation reaction is effected at a temperature of about 140 and 160° C.

5. A method as claimed in claim 1 in which the catalyst is a primary amine.

6. A method as claimed in claim 5 in which the catalyst is ethylene diamine.

References Cited in the file of this patent

UNITED STATES PATENTS

| | | |
|---|---|---|
| 1,705,495 | Novotny | Mar. 9, 1929 |
| 1,771,033 | Ellis | July 22, 1930 |
| 1,857,357 | Cherry et al. | May 10, 1932 |
| 2,457,493 | Redfern | Dec. 28, 1948 |